US010612380B2

(12) United States Patent
Schneider

(10) Patent No.: US 10,612,380 B2
(45) Date of Patent: Apr. 7, 2020

(54) FREE PISTON DEVICE AND METHOD FOR OPERATING A FREE PISTON DEVICE

(71) Applicant: Deutsches Zentrum für Luft- und Raumfahrt e.V., Cologne (DE)

(72) Inventor: Stephan Schneider, Stuttgart (DE)

(73) Assignee: Deutsches Zentrum für Luft- und Raumfahrt e.V. (DE)

( * ) Notice: Subject to any disclaimer, the term of this patent is extended or adjusted under 35 U.S.C. 154(b) by 0 days.

(21) Appl. No.: 16/192,291

(22) Filed: Nov. 15, 2018

(65) Prior Publication Data

US 2019/0085695 A1    Mar. 21, 2019

Related U.S. Application Data

(63) Continuation of application No. PCT/EP2017/061510, filed on May 12, 2017.

(30) Foreign Application Priority Data

May 17, 2016    (DE) .................. 10 2016 109 029

(51) Int. Cl.
*F01B 11/00*    (2006.01)
*F02B 31/00*    (2006.01)
(Continued)

(52) U.S. Cl.
CPC .............. *F01B 11/007* (2013.01); *F01B 7/02* (2013.01); *F01B 11/00* (2013.01); *F01B 11/02* (2013.01);
(Continued)

(58) Field of Classification Search
CPC ......... F01B 11/007; F01B 11/02; F01B 7/02; F01B 71/04; F01B 63/041; F01P 3/02; F02B 75/282
See application file for complete search history.

(56) References Cited

U.S. PATENT DOCUMENTS 3,411,289 A    11/1968 Antonsen et al.
4,048,970 A    9/1977 Fitzgerald
(Continued)

FOREIGN PATENT DOCUMENTS

AU    6302199 A    6/2001
AU    4205001 A    12/2001
(Continued)

OTHER PUBLICATIONS

International Preliminary Report on Patentability for Application No. PCT/EP2017/061516, dated Nov. 20, 2018—6 pages.
(Continued)

*Primary Examiner* — George C Jin
(74) *Attorney, Agent, or Firm* — RatnerPrestia

(57) ABSTRACT

A free piston apparatus includes a piston receptacle in which a piston device having a piston is reciprocable along an axis. The piston receptacle includes a combustion chamber delimited by a wall arrangement forming an inlet opening for the supply of fresh gas and an outlet opening for the removal of exhaust gas. The free piston apparatus includes an inflow device, which has the inlet opening and is configured such that fresh gas flowing into the combustion chamber is directed to an incident flow region in the combustion chamber arranged offset axially to the inlet opening, which incident flow region is arranged off-center relative to the axis. A method for operating a free piston apparatus includes operating an inflow device which has an inlet opening configured such that fresh gas is directed to an incident flow region in a combustion chamber offset axially to the inlet opening.

24 Claims, 5 Drawing Sheets

(51) Int. Cl.
  *F02B 71/00* (2006.01)
  *F01B 7/02* (2006.01)
  *F01B 11/02* (2006.01)
  *F01P 3/02* (2006.01)
  *F02B 71/04* (2006.01)
  *F02B 75/28* (2006.01)
  *F02B 63/04* (2006.01)
  *F02B 75/02* (2006.01)

(52) U.S. Cl.
  CPC ............... *F01P 3/02* (2013.01); *F02B 31/00* (2013.01); *F02B 71/00* (2013.01); *F02B 71/04* (2013.01); *F02B 75/282* (2013.01); *F02B 63/041* (2013.01); *F02B 2075/025* (2013.01); *Y02T 10/146* (2013.01)

(56) References Cited

U.S. PATENT DOCUMENTS

| | | |
|---|---|---|
| 4,287,859 A | 9/1981 | Noguchi et al. |
| 5,002,020 A | 3/1991 | Kos |
| 5,893,343 A | 4/1999 | Rigazzi |
| 6,029,616 A | 2/2000 | Mayne et al. |
| 6,138,639 A | 10/2000 | Hiraya et al. |
| 6,748,907 B2 | 6/2004 | Malmquist et al. |
| 6,904,876 B1 | 6/2005 | Hofbauer et al. |
| 7,082,909 B2 | 8/2006 | Gräf et al. |
| 7,258,085 B2 | 8/2007 | Niiyama et al. |
| 8,887,690 B1 | 11/2014 | Sturman |
| 2002/0134324 A1 | 9/2002 | Wechner |
| 2003/0066499 A1 | 4/2003 | Berlinger et al. |
| 2003/0094164 A1 | 5/2003 | Lowi et al. |
| 2005/0109295 A1 | 5/2005 | Kaneko et al. |
| 2005/0274332 A1 | 12/2005 | Lemke et al. |
| 2006/0042575 A1 | 3/2006 | Schmuecker et al. |
| 2006/0124083 A1 | 6/2006 | Niiyama et al. |
| 2006/0201456 A1 | 9/2006 | Hofbauer |
| 2007/0261677 A1 | 11/2007 | Bennion |
| 2008/0036312 A1 | 2/2008 | Max et al. |
| 2009/0101005 A1 | 4/2009 | Pohl et al. |
| 2012/0112468 A1 | 5/2012 | Najt et al. |
| 2012/0186561 A1 | 7/2012 | Bethel et al. |
| 2012/0266851 A1 | 10/2012 | Hofbauer et al. |
| 2013/0014718 A1* | 1/2013 | Shen ............... F02B 23/0675 123/18 A |
| 2013/0167798 A1* | 7/2013 | Lawler ............... F02F 1/18 123/193.4 |
| 2013/0319368 A1 | 12/2013 | Clarke |
| 2015/0033736 A1* | 2/2015 | Kalebjian ........... F02B 29/0412 60/605.2 |
| 2015/0300241 A1 | 10/2015 | Holland |
| 2016/0208686 A1 | 7/2016 | Gadda et al. |
| 2017/0204801 A1* | 7/2017 | Sharma ............... F02D 41/3064 |
| 2017/0248099 A1* | 8/2017 | Wagner ............... F01B 7/14 |

FOREIGN PATENT DOCUMENTS

| | | |
|---|---|---|
| AU | 2003232496 A1 | 11/2003 |
| AU | 2003236392 A1 | 5/2004 |
| CH | 188403 A | 12/1936 |
| DE | 2844309 A1 | 10/1979 |
| DE | 3103432 A1 | 9/1982 |
| DE | 3111419 A1 | 10/1982 |
| DE | 3047138 A1 | 11/1982 |
| DE | 3438219 A1 | 4/1986 |
| DE | 10219549 B4 | 3/2004 |
| DE | 10242141 A1 | 3/2004 |
| DE | 69817998 T2 | 5/2004 |
| DE | 102004062440 B4 | 9/2006 |
| DE | 102005006340 A1 | 4/2007 |
| DE | 102005056823 A1 | 5/2007 |
| DE | 102006029532 A1 | 12/2007 |
| DE | 102008030633 B4 | 4/2010 |
| DE | 102008053068 A1 | 4/2010 |
| DE | 102008053069 A1 | 5/2010 |
| DE | 102012111067 B3 | 2/2014 |
| EP | 1398863 A1 | 3/2004 |
| EP | 2224580 A2 | 9/2010 |
| GB | 889509 | 2/1962 |
| GB | 2334385 A | 8/1999 |
| WO | 9533921 A1 | 12/1995 |
| WO | 9728362 A1 | 8/1997 |
| WO | 9813593 A1 | 4/1998 |
| WO | 0145977 A2 | 6/2001 |
| WO | 0194752 A1 | 12/2001 |
| WO | 03091556 A1 | 11/2003 |
| WO | 2004025098 A1 | 3/2004 |
| WO | 2007010186 A1 | 1/2007 |
| WO | 2007085344 A1 | 8/2007 |
| WO | 2007147789 A1 | 12/2007 |
| WO | 2008028216 A1 | 3/2008 |
| WO | 2009156257 A1 | 12/2009 |
| WO | 2010046120 A1 | 4/2010 |
| WO | 2010046121 A1 | 4/2010 |
| WO | 2012158756 A1 | 11/2012 |

OTHER PUBLICATIONS

International Search Report and Written Opinion for Application No. PCT/EP2017/061516, dated Aug. 9, 2017—7 pages.
International Search Report and Written Opinion for International Application No. PCT/EP2017/061495, dated Aug. 9, 2017—10 pages.
International Preliminary Report on Patentability for Application No. PCT/EP2017/061522, dated Nov. 20, 2018—8 pages.
International Search Report and Written Opinion for Application No. PCT/EP2017/061522, dated Aug. 9, 2017—9 pages.
Non Final Office Action for U.S. Appl. No. 16/192,301, dated May 14, 2019, 19 pages.
International Search Report and Written Opinion for International Application No. PCT/EP2017/061510, dated Aug. 10, 2017—9 pages.
International Preliminary Report on Patentability for International Application No. PCT/EP2017/061510, dated Nov. 20, 2018, 8 pages.
Notice of Allowance for U.S. Appl. No. 16/192,301, dated Nov. 18, 2019, 13 pages.
Non Final Office Action for U.S. Appl. No. 16/192,266, dated Feb. 5, 2020, 31 pages.
Non Final Office Action for U.S. Appl. No. 16/192,283, dated Feb. 6, 2020, 29 pages.

* cited by examiner

FREE PISTON DEVICE AND METHOD FOR OPERATING A FREE PISTON DEVICE

CROSS-REFERENCE TO RELATED APPLICATIONS

This application is a continuation patent application of International Application No. PCT/EP2017/061510, filed May 12, 2017, and claims the benefit of German Application No. 10 2016 109 029.8, filed May 17, 2016. The contents of International Application No. PCT/EP2017/061510 and German Application No. 10 2016 109 029.8 are incorporated by reference herein in their entireties and for all purposes.

FIELD

The present disclosure relates to a free piston apparatus, comprising a piston receptacle in which at least one piston device having a piston is arranged so as to be reciprocable along an axis, wherein the piston receptacle comprises or forms a combustion chamber delimited by a wall arrangement in which at least one inlet opening for the supply of fresh gas and, spaced apart therefrom in axial direction, at least one outlet opening for the removal of exhaust gas are formed. Furthermore, the present disclosure relates to a method for operating a free piston apparatus of that kind.

BACKGROUND

In a free piston apparatus of that kind, which is commonly operated in the two stroke method, the piston device oscillates back and forth in the piston receptacle. Upon the combustion of a gas-fuel-mixture in the combustion chamber, the piston is moved from a top dead center to a bottom dead center. Upon adopting the bottom dead center, the at least one inlet opening and the at least one outlet opening are opened and fresh gas is able to flow into the combustion chamber. Exhaust gas may be removed from the combustion chamber. The piston may act as a valve body with which, upon adopting the bottom dead center, the at least one inlet opening or the at least one outlet opening is at least partially unblocked and is blocked again upon the upward movement of the piston. The upward movement of the piston occurs under the action of a spring-back device of the free piston apparatus for the piston device. The spring-back device comprises for example a gas spring with a gas which is compressible by way of the piston device. Upon an expansion of the gas, the piston device is moved in the opposite direction for the upward movement of the piston. Alternatively or in addition, a mechanical spring-back device may be provided.

"Fresh gas" is presently to be understood as a gas or gas mixture (in particular air) for the internal combustion in the combustion chamber, wherein a fuel may also be admixed to the gas. "Fresh gas" may therefore presently also refer to a gas-fuel-mixture which may flow into the combustion chamber via the at least one entry opening. "Exhaust gas" presently refers to a combustion product of the internal combustion.

In the conventional free piston apparatus, a scavenging gradient is caused by the openings for the inlet and for the outlet, which are axially spaced apart from each other, and the combustion chamber is scavenged in axial direction (so-called uniflow scavenging) for the charge exchange. "Axial" and "radial" presently refer to the axis defined by the piston receptacle, along which the piston device is moved.

Free piston apparatuses may be operated in auto-ignition operation or with spark ignition, wherein an ignition device is arranged at the combustion chamber. It proves in practice to be advantageous to optimize the inflow conditions of the fresh gas into the combustion chamber with respect to the respective mixture and the spark ignition or the auto-ignition operation. For example, it is known in the case of free piston apparatuses to inflow fresh gas radially in relation to the axis for the auto-ignition operation. A helical movement of the flow forms in the combustion chamber. A flow of that kind proves to be less suitable for spark ignition operation, however.

SUMMARY

The object underlying the present disclosure is to provide a free piston apparatus of the kind stated at the outset in which the inflow of fresh gas is optimized with respect in particular to a spark ignition operation.

In a first aspect of the present disclosure, a free piston apparatus comprises a piston receptacle in which at least one piston device having a piston is arranged so as to be reciprocable along an axis. The piston receptacle comprises or forms a combustion chamber delimited by a wall arrangement in which at least one inlet opening for the supply of fresh gas and, spaced apart therefrom in axial direction, at least one outlet opening for the removal of exhaust gas are formed. The free piston apparatus comprises an inflow device for fresh gas, which has the at least one inlet opening and is configured in such a way that fresh gas flowing into the combustion chamber is directed to an incident flow region in the combustion chamber which is offset axially to the at least one inlet opening in the direction of the at least one outlet opening, wherein the incident flow region is arranged off-center relative to the axis.

In a second aspect of the disclosure, a method for operating a free piston apparatus is provided. The free piston apparatus comprises a piston receptacle in which at least one piston device having a piston is arranged so as to be reciprocable along an axis. The piston receptacle comprises or forms a combustion chamber delimited by a wall arrangement in which at least one inlet opening for the supply of fresh gas and, spaced apart therefrom in axial direction, at least one outlet opening for the removal of exhaust gas are formed. An inflow device for fresh gas is provided, which has the at least one inlet opening and is configured in such a way that fresh gas flowing into the combustion chamber is directed to an incident flow region in the combustion chamber arranged offset axially to the at least one inlet opening in the direction of the at least one outlet opening, wherein the incident flow region is arranged off-center relative to the axis.

BRIEF DESCRIPTION OF THE DRAWINGS

The foregoing summary and the following description may be better understood in conjunction with the drawing figures, of which.

DETAILED DESCRIPTION

Figure 1:
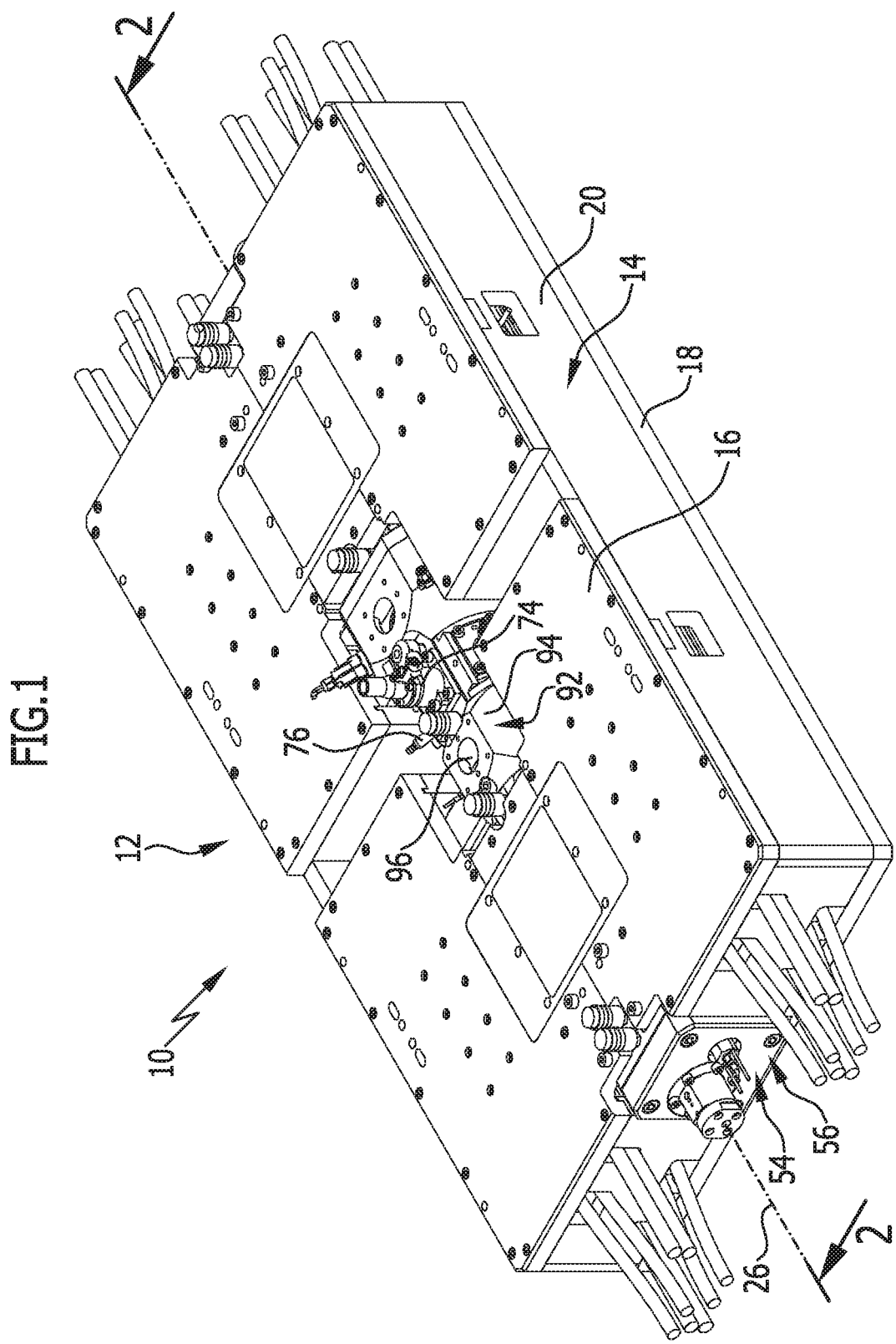
FIG. 1: shows a perspective depiction of a free piston apparatus in accordance with the disclosure.

Although the present disclosure illustrates and describes specific embodiments, the present disclosure is not intended to be limited to the details shown. Rather, various modifications may be made in the details without departing from the present disclosure.

The present disclosure relates to a free piston apparatus, comprising a piston receptacle in which at least one piston device having a piston is arranged so as to be reciprocable along an axis, wherein the piston receptacle comprises or forms a combustion chamber delimited by a wall arrangement in which at least one inlet opening for the supply of fresh gas and, spaced apart therefrom in axial direction, at least one outlet opening for the removal of exhaust gas are formed. The free piston apparatus comprises an inflow device for fresh gas, which has the at least one inlet opening and is configured in such a way that fresh gas flowing into the combustion chamber is directed to an incident flow region in the combustion chamber which is offset axially to the at least one inlet opening in the direction of the at least one outlet opening, wherein the incident flow region is arranged off-center relative to the axis.

In the free piston apparatus in accordance with the disclosure, an incident flow region offset radially laterally next to the axis and axially with respect to the at least one inlet opening is provided, to which region the fresh gas inflow is directed. The amount of inflowing fresh gas to the incident flow region is thereby greater than in the direction to the opposite side of the combustion chamber with respect to the axis. This results in an incident flow asymmetrical to the axis, which causes vortexes on the side of the wall arrangement of the combustion chamber adjacent to the incident flow region. A helical movement about the axis may be avoided. Upon the compression of the fresh gas when the piston carries out the upward movement, the vortexes form smaller swirls and lead to stronger turbulence. The turbulent flame speed upon the combustion is increased, whereby the fuel is more quickly converted and a higher degree of efficiency with lower emission may be achieved. An extinguishing of the flames after the ignition, as it may occur in the case of a helical movement of the fresh gas in the spark ignition operation, may thus be avoided.

It is advantageous if the inflow device is configured such that a tumble-shaped movement of the inflowing fresh gas in the combustion chamber is achievable, wherein inflowing fresh gas rolls in particular about a tumble axis aligned transverse to the axis. It proves in practice that a tumble-shaped movement of that kind (tumble) enables a particularly advantageous conversion of the fuel in the spark ignition operation.

The tumble axis is preferably arranged centrally or substantially centrally between the at least one inlet opening and the at least one outlet opening.

It is advantageous if the incident flow region is arranged in axial direction approximately centrally between the at least one inlet opening and the at least one outlet opening, or if the incident flow region is arranged upstream of a center between the at least one inlet opening and the at least one outlet opening in the direction of the at least one inlet opening. "Central" between the openings refers in particular to a center of the combustion chamber, for example in the case of an opposed piston arrangement.

The incident flow region may be arranged, e.g., approximately in the middle between the axis and the wall arrangement. It is alternatively conceivable for the incident flow region to be positioned adjacent to the wall arrangement.

The piston receptacle preferably has a hollow-cylindrical shape at the wall arrangement, at least from the at least one inlet opening to the at least one outlet opening.

The at least one inlet opening is advantageously of slit-shaped or shaft-shaped configuration.

It is advantageous if the at least one inlet opening is configured tilted relative to the axis for achieving an axial movement component of inflowing fresh gas. The inlet opening has a tilt relative to the axis, such that inflowing fresh gas may flow into the combustion chamber with an axial component. In this way, the flow of the fresh gas is directed to an incident flow region in the combustion chamber directed between the at least one inlet opening and the at least one outlet opening.

In particular, a plurality of inlet openings may be provided, which are configured tilted relative to the axis and thereby give the respective inflowing fresh gas an axial movement component.

Favorably, a plurality of inlet openings which are spaced apart from each other in circumferential direction of the axis are provided. The inlet openings are preferably formed at the same position on the wall arrangement in axial direction.

It is advantageous if the inlet openings are arranged and configured on the wall arrangement so as to be mirror-symmetrical to each other with respect to a central longitudinal plane of the piston receptacle containing the axis. This enables, for example, an inflow of fresh gas in the direction to the central longitudinal plane in such a way that equal or substantially equal volumetric flows of fresh gas inflow on both sides of the central longitudinal plane. As a result, a formation of a helical flow is able to be avoided.

It is favorable if an inlet opening is provided which, with respect to a section plane transverse to the axis, is directed radial to the axis and towards a side of the wall arrangement opposite the inlet opening. The incident flow region may be arranged on the side of the combustion chamber opposite the inlet opening. The fresh gas inflowing via the inlet opening has a radial movement component which is directed to the axis and the side of the wall arrangement opposite the inlet opening. In addition, an axial movement component of the fresh gas is preferably present as a result of the previously mentioned tilt of the inlet opening relative to the axis. Fresh gas flows to the side of the combustion chamber opposite of the inlet opening between the axis and the wall arrangement, whereby an incident flow region is formed at this location. The incident flow region is opposite the inlet opening with respect to the axis.

It is advantageous if no inlet opening is formed on a side on the wall arrangement opposite said inlet opening with respect to the axis, in particular diametrically opposed to the inlet opening. An asymmetric inflow of fresh gas thereby occurs radial to the axis, preferably for forming a tumble-shaped movement.

The inlet opening is in particular arranged on a central longitudinal plane of the piston receptacle containing the axis.

The inlet opening is favorably radially flowed against.

An inlet opening may preferably be provided which, with respect to a section plane transverse to the axis, is not directed radial to the axis, but rather to a region of the combustion chamber which has an angular distance to the inlet opening of less than 180° in circumferential direction of the axis. Fresh gas inflowing through said inlet opening is thereby directed to a region of the combustion chamber which is not radially opposite the inlet opening with respect to the axis. The inlet opening is preferably configured so as to be curved or bowed in the direction to the region of the combustion chamber. This facilitates the formation of a tumble-shaped movement of fresh gas.

It is advantageous if associated with the inlet opening is a corresponding inlet opening aligned as a mirror image thereto with respect to a central longitudinal plane. This enables a volumetric flow which is equal in magnitude from both sides of the central longitudinal plane. The formation of a helical movement of the fresh gas may be thereby avoided.

In addition to the inlet opening which has an angular distance to the aforementioned region of the combustion chamber in circumferential direction of the axis, preferably at least one further inlet opening is provided which is directed to the same region of the combustion chamber which has a smaller angular distance to the further inlet opening in circumferential direction of the axis than the first mentioned inlet opening.

In the last mentioned embodiment, it is advantageous if the greater the angular distance between the inlet opening and the region of the combustion chamber, the greater a volumetric flow of inflowing fresh gas is. In circumferential direction of the axis, the inlet openings located closer to the stated region of the combustion chamber (with respect to the angular distance in a section plane transverse to the axis) act upon the combustion chamber with a smaller volumetric flow of fresh gas. The asymmetry of the fresh gas inflow is thereby increased and this facilitates the formation of the defined incident flow region and preferably of a tumble-shaped movement of fresh gas in the combustion chamber.

It proves to be advantageous if the inflow device comprises or forms an inflow chamber which surrounds the wall arrangement and which is able to be acted upon with fresh gas by way of a supply conduit and which opens into the combustion chamber via the at least one inlet opening, in particular via the plurality of inlet openings. A settling of the fresh gas for damping pulsations and turbulence may occur in the inflow chamber, which proves to be advantageous for the flow conditions upon inflow into the combustion chamber.

In an advantageous embodiment, the inflow chamber is annular or substantially annular and in particular circular ring-shaped in cross section to the axis. For example, the inflow chamber is toroidal and which allows fresh gas to flow via an entry opening.

An eccentric, non-coaxial alignment of the inflow chamber relative to the axis is particularly advantageous in the case of annular cross section. As a result, the inflow chamber has different cross sections at different positions relative to the wall arrangement. For example, the cross section of the inflow chamber on the side to which the inflow chamber is eccentrically offset in relation to the axis is larger on the side of the inflow chamber opposite the axis. If the inflow of fresh gas from the first mentioned side (e.g. through an inlet opening aligned radial to the axis), then an asymmetrical inflow into the combustion chamber may thereby occur. As was laid out above, the smaller the angular distance between the inlet opening and the incident flow region in the combustion chamber is, the less intensely further inlet openings following in circumferential direction of the axis are flowed through.

The free piston apparatus may have an actuator on at least one inlet opening, by way of which the inflow direction for fresh gas into the combustion chamber is adjustable. For example, a setting of the respective actuator may be adjusted by means of a control device of the free piston apparatus in order to enable an optimal inflow of fresh gas and thereby optimize the operating point of the free piston apparatus.

As mentioned, in particular an ignition device for an operation with spark ignition may be provided at the combustion chamber.

Alternatively or in addition, in particular an injection device for injecting a fuel may be provided at the combustion chamber.

The piston receptacle may comprise a housing and a piston bushing which is inserted into the housing and comprises or forms the wall arrangement. The piston may be reciprocable in the piston bushing and the at least one inlet opening and preferably the at least one outlet opening may be formed in the piston bushing. The piston bushing is in particular a cylinder bushing.

The free piston apparatus preferably comprises an energy coupling device which is coupled to the piston device and by way of which energy is able to be decoupled from the piston device or by way of which energy is able to be coupled into the piston device. In particular, there is the possibility of controlling the movement of the piston device by means of the energy coupling device. "Control" is presently to be interpreted as "regulating" also being meant alternatively or in addition. "Controlling" may thus presently be interpreted as "controlling and/or regulating". By the controlling of the energy coupling device, which may be carried out by a control device of the free piston apparatus, the operating point of the free piston apparatus in operation may be adjusted. For this purpose, as needed, energy may be transmitted from the energy coupling device to the piston device or energy may be removed from the piston device by way of the energy coupling device.

The energy coupling device advantageously comprises at least one linear generator. The linear generator has for example a rotor arrangement fixed on the piston device and a stator arrangement. Rotor arrangement and stator arrangement are or comprise in particular magnets and coils, respectively.

Two linear generators with a respective rotor arrangement and a respective stator arrangement may be associated with the piston device. A respective linear generator may for example be positioned laterally next to the piston receptacle and form one of the subsequently mentioned units of the energy coupling device.

It is advantageous if the energy coupling device is positioned laterally next to the piston receptacle and aligned parallel thereto. This enables a compact structural shape of the free piston apparatus.

The energy coupling device may comprise a first unit and a second unit which each are positioned laterally next to the piston receptacle, wherein the piston receptacle is arranged between the units of the energy coupling device. For compensating the moved masses and moments, it is favorable if the energy coupling device comprises two units, of which each, for example as mentioned above, is formed by a linear generator.

The piston is favorably movable at least partially over the at least one inlet opening, wherein the latter is at least partially unblockable upon the piston adopting the bottom dead center. In this way, the piston may form a valve body for the at least one inlet opening. A separate valve may be dispensed with. At the bottom dead center of the piston, fresh gas may flow out of the settling chamber through the at least one inlet opening for scavenging the combustion chamber.

The free piston apparatus preferably comprises a further piston device having a piston, wherein the pistons of both piston devices are positioned in opposed piston arrangement, wherein the combustion chamber is formed between the pistons. By way of the opposed piston arrangement, a compensation of the moved masses and moments may preferably be achieved. The piston devices thereby oscillate opposite to each other in the piston receptacle. The combustion chamber is formed variable in size between the pistons as a result of the opposing movement of the piston devices.

The free piston apparatus may comprise a further spring-back device which is associated with the further piston device. The spring-back device may comprise a gas spring and/or be of mechanical configuration.

An energy coupling device may also be associated with the further piston device, which energy coupling device is preferably positioned laterally next to the piston receptacle. The energy coupling device may comprise a linear generator. For example, two units of the further energy coupling device which in each case are positioned laterally next to the piston receptacle are provided. Each unit may be formed by a linear generator.

The piston of the further piston device is preferably movable at least partially over the at least one outlet opening, wherein the latter is at least partially unblockable upon the piston adopting the bottom dead center. As a result, the piston may form a valve body for the at least one outlet opening. A separate valve may be dispensed with. At the bottom dead center of the piston, exhaust gas is able to flow out of the combustion chamber through the at least one outlet opening.

The present disclosure further relates to a method for operating a free piston apparatus of the kind stated at the outset. In accordance with the method, an inflow device for fresh gas is provided, which has the at least one inlet opening and is configured in such a way that fresh gas flowing into the combustion chamber is directed to an incident flow region in the combustion chamber arranged offset axially to the at least one inlet opening in the direction of the at least one outlet opening, which incident flow region is arranged off-center relative to the axis.

The advantages which were already mentioned in conjunction with the explanation of the free piston apparatus in accordance with the disclosure may also be achieved in a performance of the method. Reference may be made to the preceding remarks in this regard.

Advantageous embodiments of the method in accordance with the disclosure result from advantageous embodiments of the free piston apparatus in accordance with the disclosure. To avoid repetition, reference may also be made to preceding remarks in this regard.

The drawing shows an advantageous embodiment of a free piston apparatus in accordance with the disclosure, which is applied with the reference numeral 10, which in particular forms a free piston motor 12.

The free piston apparatus 10 comprises an outer housing 14 which is presently cuboidal and is configured as flat housing. The housing 14 defines a receiving space 22 between an upper wall 16, a lower wall 18, and a side wall 20.

Figure 2:
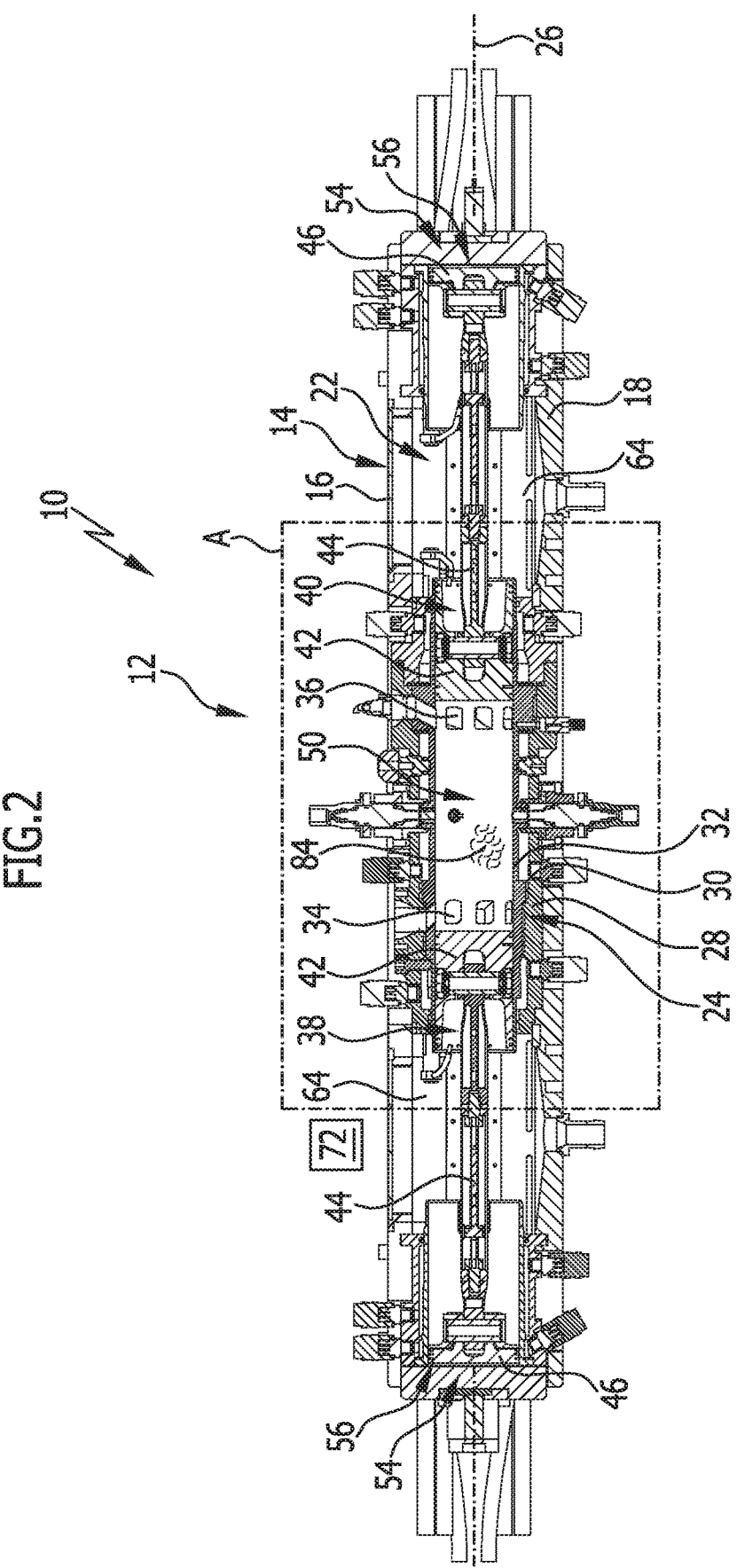
FIG. 2: shows a longitudinal sectional view of the free piston apparatus from FIG. 1.
Figure 3:
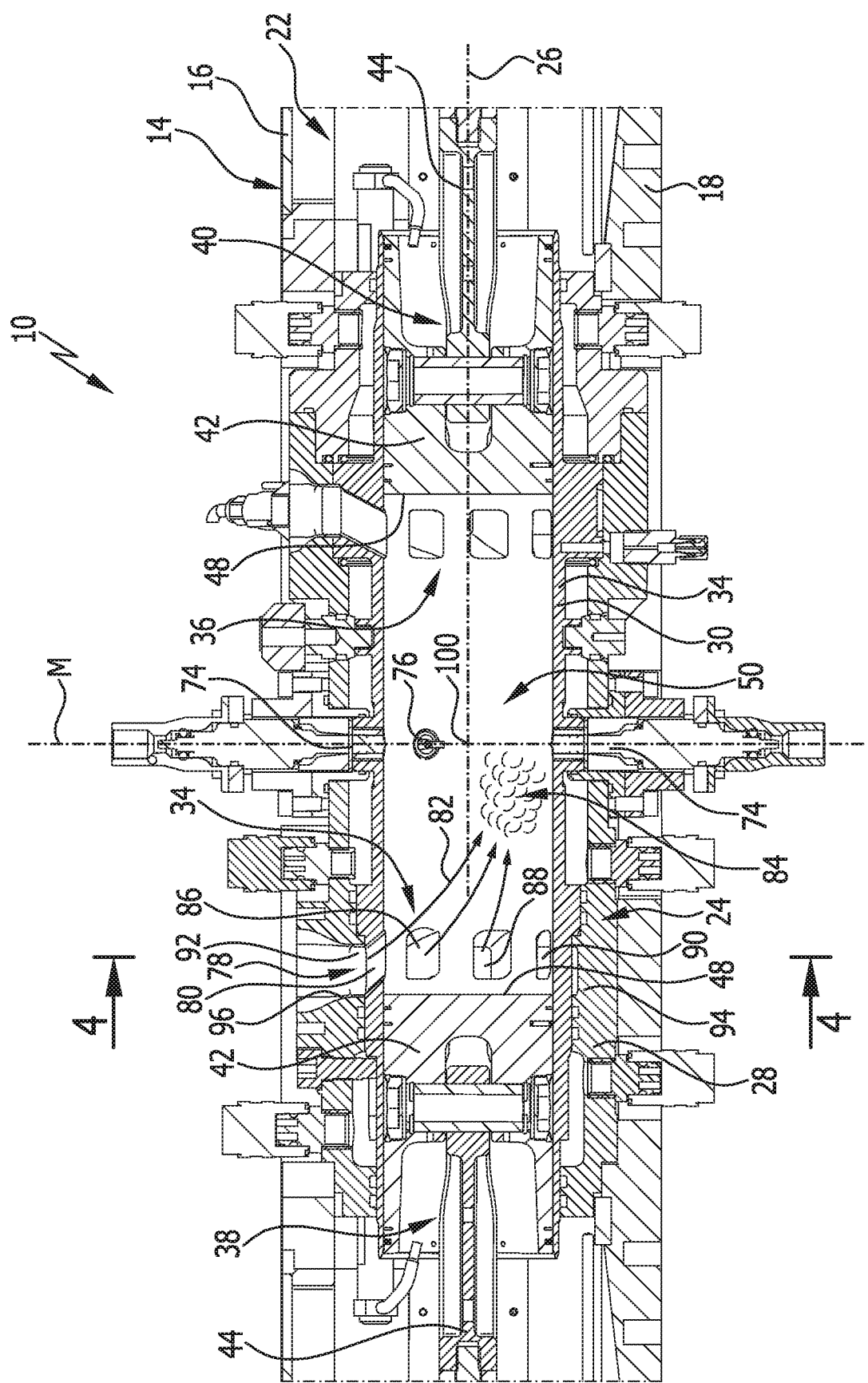
FIG. 3: shows an enlarged depiction of detail A in FIG. 2.
Figure 4:
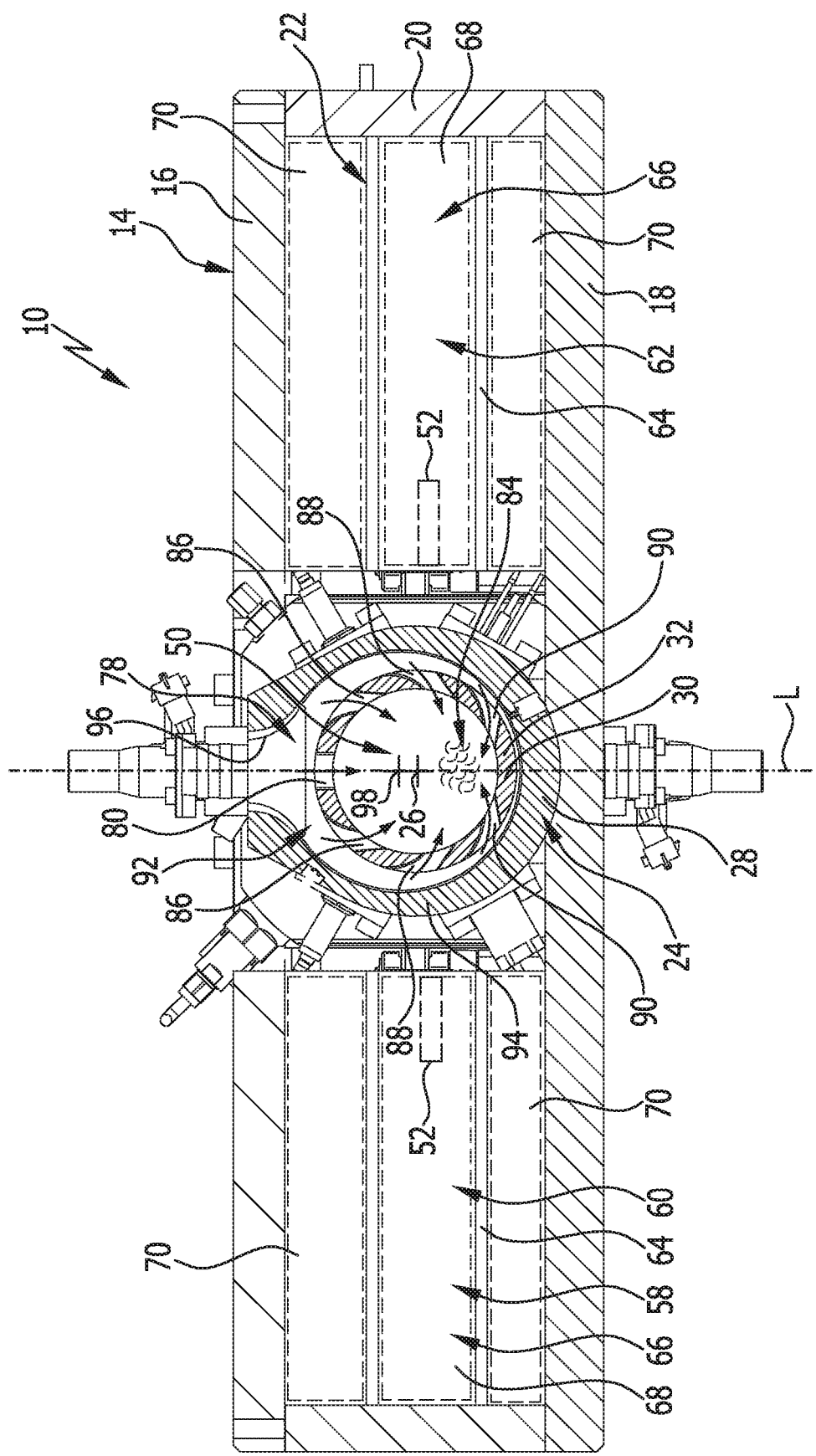
FIG. 4: shows a sectional view along the line 4-4 in FIG. 3.

A piston receptacle 24 is arranged in the housing 14. The piston receptacle 24 is longitudinally extended and defines an axis 26 of the free piston apparatus 10. The piston receptacle 24 has a housing 28 of approximately hollow-cylindrical shape which is divided into individual sections. A piston bushing 30 of the piston receptacle 24 is arranged in the housing 28. The piston bushing 30 is substantially of hollow-cylindrical configuration and is inserted into a middle section of the housing 28 (FIGS. 2 to 4).

Openings are formed in a wall arrangement 32 of the piston bushing 30 and thus the piston receptacle 24. The openings comprise inlet openings 34 on the one hand and outlet openings 36 on the other. The inlet openings 34 are axially spaced apart from the outlet openings 36. "Axial" and "radial" presently refer to the axis 26. "Axial" also includes a direction running parallel to the axis 26. The inlet openings 34 and the outlet openings 36 are, e.g., of slit-shaped or shaft-shaped configuration.

The free piston apparatus 10 comprises two piston devices 38, 40. The piston devices 38, 40 are arranged in the piston receptacle 24 so as to be axially reciprocable. Each piston device 38, 40 has a (combustion) piston 42, a piston rod 44, and an opposed piston 46. The pistons 42 each comprise a piston face 48 and are positioned in opposed piston arrangement, wherein the piston faces 48 face toward each other.

The piston receptacle 24 comprises a combustion chamber 50 delimited by the wall arrangement 32. The combustion chamber 50 is variable in size and is formed between the piston faces 48 as a result of the opposing movement of the piston devices 38, 40.

The piston rod 44 connects the piston 42 to the opposed piston 46, wherein presently both pistons 42, 46 are tiltingly held on the piston rod 44. However, a rigid connection is also conceivable. Transverse to the axis 26, projections 52 protrude from the piston rod 44 on opposing sides. The projections 52 emerge from the housing 28 and project into the receiving space 22. FIG. 4 schematically shows the contours of the projections 52. The piston rod 44 thereby has an approximately cruciform shape.

The free piston apparatus 10 comprises a spring-back device 54 associated with each piston device 38, 40. The spring-back device 54 presently comprises a gas spring 56 having a spring-back space. The spring-back space is formed by the housing 28 and is arranged thereon at the end.

If the piston devices 38, 40 move from the top dead center to the bottom dead center as a result of the combustion in the combustion chamber 50, then a gas in the spring-back space is compressed by the opposed piston 46 until the piston 42 adopts its bottom dead center (FIGS. 3 and 4). Upon the expansion of the gas in the spring-back space, the respective piston device 38, 40 is again displaced in the opposite direction.

The free piston apparatus 10 has two energy coupling devices 58, wherein an energy coupling device 58 is associated with each piston device 38, 40. Each energy coupling device 58 comprises a first unit 60 and a second unit 62. The units 60, 62 are each positioned laterally next to the piston receptacle 24, but on opposing sides thereof. Both units 60, 62 define a common plane in which the piston receptacle 24 is arranged.

The energy coupling devices 58 are accommodated in the receiving space 22 of the housing 14. A spatial region 64 of the receiving space 22 is associated with each unit 60, 62, wherein each spatial region 64 is delimited by the upper wall 16, the lower wall 18, the side wall 20, and the piston receptacle 24.

Each unit 60, 62 is formed by a linear generator 66 with a rotor arrangement 68 and a stator arrangement 70. The rotor arrangement 68 is connected to the piston rod 44 by way of the projection 52 and is displaceably guided in the receiving space 22 parallel to the axis 26. The rotor arrangement 68 comprises magnets. In the drawing, the stator arrangement 70 comprises coils which are not individually depicted and are arranged above and beneath the rotor arrangement 68.

FIG. 4 shows the contours of the rotor arrangements 68 and the stator arrangement 70 of two units 60, 62. Because the piston 42 of the piston device 38 in the drawing adopts the bottom dead center, the sectional view presently does not run through the rotor arrangements 68, which are displaced and cross the sectional plane only upon the (imagined) upward movement of the piston 42.

By way of the energy coupling device 58, there is the possibility of coupling energy into the piston device 38 or 40 and to remove energy therefrom, respectively. This allows for controlling the movement of the piston device 38 or 40 in the operation of the free piston apparatus 10. For this purpose, the energy coupling devices 58 are controllable by a control device 72 (FIG. 2) of the free piston apparatus 10.

The free piston apparatus 10 presently works according to the two stroke method. A combustion in the combustion chamber 50 drives the pistons 42 apart from each other commencing from the top dead center, such that they are axially displaced in the piston bushing 30. The displacement occurs up to a respective bottom dead center of the pistons 42. When the pistons 42 adopt the bottom dead center, then the inlet openings 34 are unblocked by the piston 42 of the piston device 40, and the outlet openings 36 are unblocked by the piston 42 of the piston device 38. This is depicted in FIGS. 2 to 4.

Upon the charge exchange, when the inlet openings 34 and the outlet openings 36 are unblocked, the combustion chamber 50 is scavenged. Fresh gas flows via the inlet openings 34 into the combustion chamber 50. Exhaust gas may be removed from the combustion chamber 50 via the outlet openings 36. A uniflow scavenging of the combustion chamber 50 via the openings 34, 36 which are axially spaced apart from each other is performed.

"Fresh gas" is presently a gas or gas mixture (in particular air) for the internal combustion. A fuel may be admixed to the supplied fresh gas. It is advantageous if a fuel is admixed by way of an injection device 74 to the fresh gas flowing into the combustion chamber 50. The ignition of the charge may occur by means of an ignition device 76, i.e. the free piston apparatus 10 may be operated in particular with spark ignition. The injection device 74 and the ignition device 76 may be controllable by the control device 22.

In particular the configuration of the inlet openings 34 will subsequently be described, which openings are comprised by an inflow device 78 of the free piston apparatus 10. The inflow device 78 is optimized for an advantageous spark ignition operation with a high degree of efficiency and low emission with respect to an inflow of fresh gas into the combustion chamber 50.

As may be seen in particular from FIGS. 3 and 4, the inlet openings 34 are formed axial at the same position of the wall arrangement 32. Presently, seven inlet openings 34 are present, wherein their count could also be different.

The inlet openings are formed on the wall arrangement 32 overall symmetrical with respect to a central longitudinal plane L of the piston receptacle 24. The central longitudinal plane contains the axis 26 and is presently aligned perpendicular to the planes defined by the walls 16, 18, wherein the alignment could also be different.

A first inlet opening 80 is arranged in the central longitudinal plane L. The inlet opening 80 is, with respect to a sectional view transverse to the axis 26, directed radially to the axis 26 and the opposing side of the wall arrangement 32 (FIG. 4). In addition, the inlet opening 80 is tilted relative to the axis 26 and thus aligned with a tilt relative to the axis 26 (FIG. 3). Fresh gas which inflows through the inlet opening 80 is thereby directed with a radial movement component to the opposing side of the wall arrangement 32 and additionally has a movement component in axial direction. Inflowing fresh gas, symbolized by an arrow 82 in FIG. 3, is thereby directed to a region in the combustion chamber 50 which is subsequently referred to as incident flow region 84.

The incident flow region 84 is arranged off-center to the axis 26 and arranged between the latter and the side of the wall arrangement 32 which is opposite the inlet opening 80.

In axial direction, the incident flow region 84 is arranged in the combustion chamber 50 offset axially to the inlet openings 34 in the direction of the outlet openings 36 due to the axial movement component of the fresh gas. The incident flow region 84 is presently arranged upstream of a center between the inlet openings 34 and the outlet openings 36 in the direction of the inlet openings 34. This is visible in FIG. 3 on the basis of the position of the center transverse plane M of the combustion chamber 50 perpendicular to the axis 26.

In addition to the inlet opening 80, the inlet openings 34 comprise inlet openings 86, 88, and 90, of which in each case two are present due to the symmetrical arrangement of the inlet openings 34. In each case one inlet opening 86, 88, and 90 is located symmetrically opposite a corresponding inlet opening 86, 88, and 90 with respect to the central longitudinal plane L and is configured as a mirror-image thereto.

Commencing from the inlet opening 80, the angular distance of adjacent inlet openings 80 in circumferential direction of the axis 26 is about 50°.

The inlet openings 86 are configured such that fresh gas exiting therefrom is not directed to a region in the combustion chamber 50 which is opposite the inlet 86 opening with respect to the axis 26, as is the case with inlet opening 80. Instead, inflowing fresh gas is directed to a region in the combustion chamber 50 which has an angular distance to the inlet opening 86 of less than 180° in circumferential direction of the axis 26. The same applies to the inlet openings 88 and to the inlet openings 90.

The region to which fresh gas inflowing in each case from the inlet openings 86, 88, 90 is the incident flow region 84. The inflow hereby occurs in each case laterally past the axis 26 (FIG. 4). For this purpose, the inlet openings 86, 88, and 90 are advantageously of curved or bowed configuration.

The inlet openings 86, 88, and 90 additionally each have a tilt relative to the axis 26 in order to provide the inflowing fresh gas an axial movement component with respect to the inflowing at the incident flow region 84.

By way of the symmetrical arrangement of inlet openings 34 with respect to the central longitudinal plane L, it is avoided that inflowing fresh gas forms a helical movement in the combustion chamber 50. Volumetric flows of fresh gas which inflow from both sides via the inlet openings 86, 88, and 90 onto the central longitudinal plane L cancel each other out transverse to the axis 26. A resultant leading to a helical movement of the fresh gas is not present.

As a result of the configuration of the inflow device 78 described above, there occurs a significantly asymmetrical inflow of fresh gas into the combustion chamber 50, such that the incident flow region 84 forms which is off-center to the axis 26 and is offset from the inlet openings 34 in axial direction.

For this purpose, it is particularly advantageous for no inlet opening to be formed on the side of the wall arrangement 32 opposite the inlet opening 80, in particular diametrically opposed to the inlet opening 80.

It is further advantageous for the volumetric flows through the inlet openings 80 and 86 to 90 to be different sizes. In particular, the larger the angle in circumferential direction of the axis 26 between the respective inlet opening 80 and 86 to 90 and the lower side of the wall arrangement 32 to which the incident flow region 84 is adjacent, the larger the volumetric flows are.

For this purpose, it is favorable for the inflow device 78 to form an inflow chamber 92. The inflow chamber 92 is configured to be housing-like and comprises an outer wall 94 which is presently formed by the housing 28. The outer wall 94 is arranged radially outside the wall arrangement 32 in the axial region of the inlet openings 34.

Formed in the outer wall 94 is an entry opening 96 to which a supply conduit for fresh gas, not depicted in the drawing, or a corresponding connecting element for a supply conduit may be connected. The entry opening 96 is formed on the side of the outer wall 94 facing the inlet opening 80 and is arranged in the region of the central longitudinal plane L (FIG. 4).

The inflow chamber 92 is approximately toroidal and has thus has in cross section a substantially annular shape. However, the inflow chamber 92 is aligned eccentrically, non-coaxial to the piston bushing 30. An axis 98, which is defined by the inflow chamber 92, is offset in relation to the axis 26, namely in the direction of the inlet opening 80.

The arrangement and configuration of the inflow chamber 92 has the result that fresh gas entering through the entry opening 96 inflows into the combustion chamber 50 with a high volumetric flow via the inlet opening 80 radially in the direction of the axis 26 (as well as with the axial movement component).

Above the inlet opening 80, the inflowing fresh gas forms two further partial streams which flow around the wall arrangement 32 in opposite directions. Each partial stream enters into the combustion chamber through the inlet openings 86, 88, and 90.

Due to the eccentric arrangement of the inflow chamber 92, the volumetric flow through the inlet openings 86 is greater than the volumetric flow through the inlet openings 88, which itself is greater than the volumetric flow through the inlet openings 90. This results from the cross sectional area reducing in flow direction of the fresh gas in the inflow chamber 92 as a result of the eccentric arrangement.

The highly asymmetrical inflow of fresh gas into the combustion chamber 50 and the formation of the incident flow region 84 leads to a tumble-shaped movement of the fresh gas in the combustion chamber. By approximation, the fresh gas tumbles in the combustion chamber 50, namely about a tumble axis 100 running approximately in the center of the combustion chamber. The tumble axis 100 is aligned transverse to the axis 26.

Figure 5:
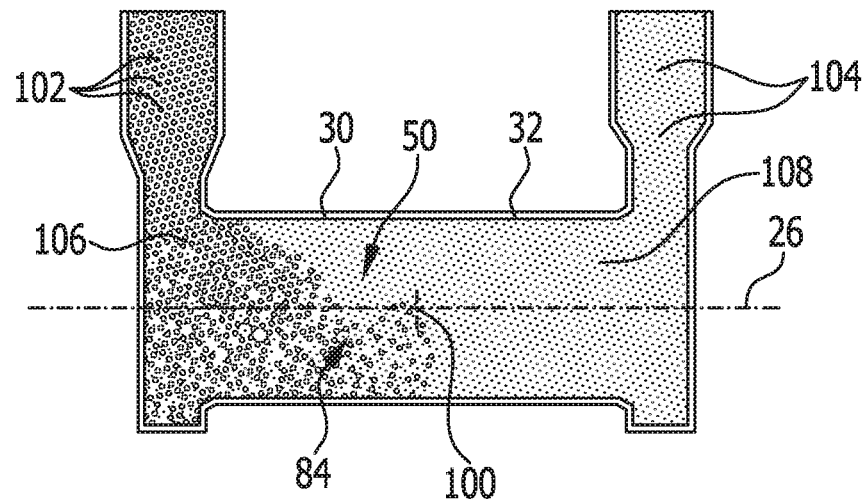
FIGS. 5 to 7: show schematically the inflow of fresh gas into a combustion chamber of the free piston apparatus from FIG. 1 upon the charge exchange and at three successive points in time, wherein a tumble-shaped movement of fresh gas in the combustion chamber forms.
Figure 6:
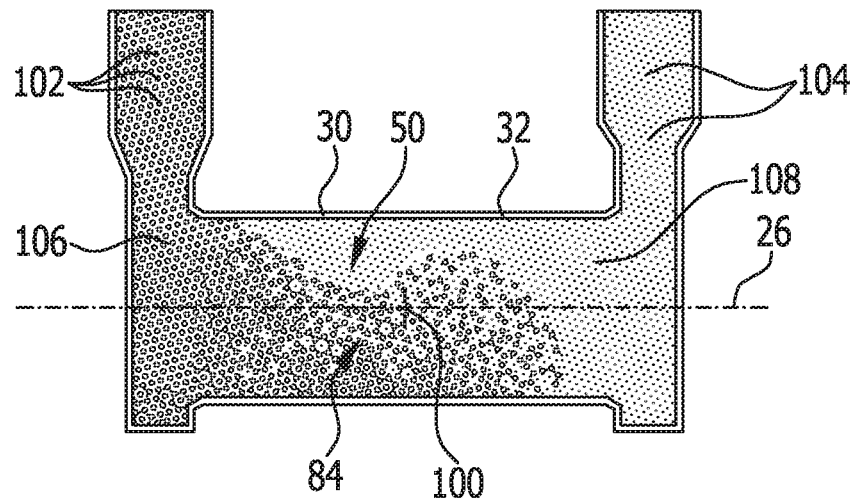
Figure 7:
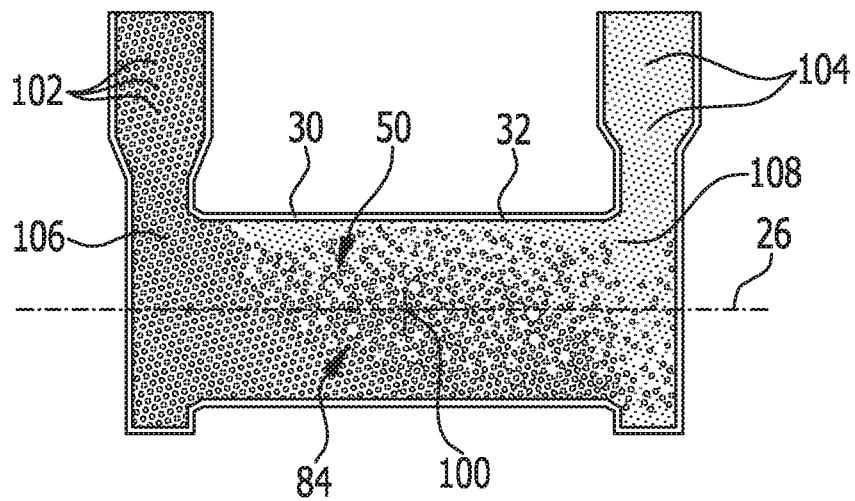

FIGS. 5, 6, and 7 show the mixing ratio of inflowing fresh gas to the outflowing exhaust gas at successive times upon the charge exchange. The inflowing fresh gas is symbolized by open circles 102 and the outflowing exhaust gas by dots 104. The inlet openings 34 are arranged in the region designated with the reference numeral 106 and the outlet openings 36 in the region designated with the reference numeral 108.

It is shown that inflowing fresh gas at the beginning of the charge exchange (FIG. 5) is directed to the incident flow region 84 and as the charge exchange progresses (FIGS. 5 and 6) an approximately tumble-shaped movement about the tumble axis 100 forms in the combustion chamber 50.

Such a distribution of fresh gas in the combustion chamber 50 for an operation with spark ignition by way of the ignition device 76 proves in practice to be advantageous. Upon the upward movement of the pistons 42, smaller swirls of fresh gas are formed and the turbulence is increased. The conversion of the fuel after the ignition occurs more quickly and the degree of efficiency is increased with low emission.

REFERENCE NUMERALS 10 free piston apparatus
12 free piston motor
14 housing
16 upper wall
18 lower wall
20 side wall
22 receiving space
24 piston receptacle
26 axis
28 housing
30 piston bushing
32 wall arrangement
34 inlet opening
36 outlet opening
38 piston device
40 piston device
42 piston
44 piston rod
46 opposed piston
48 piston face
50 combustion chamber
52 projection
54 spring-back device
56 gas spring
58 energy coupling device
60 unit
62 unit
64 spatial region
66 linear generator
68 rotor arrangement
70 stator arrangement
72 control device
74 injection device
76 ignition device
78 inflow device
80 inlet opening
82 arrow
84 incident flow region
86 inlet opening
88 inlet opening
90 inlet opening
92 inflow chamber
94 outer wall
96 entry opening
98 axis
100 tumble axis
102 open circle (fresh gas)
104 point (exhaust gas)
106 region of inlet openings
108 region of outlet openings

The invention claimed is:

1. A free piston apparatus comprising a piston receptacle in which at least one piston device having a piston is arranged so as to be reciprocable along an axis, wherein the piston receptacle comprises or forms a combustion chamber delimited by a wall arrangement in which at least one inlet opening for the supply of fresh gas and, spaced apart therefrom in axial direction, at least one outlet opening for the removal of exhaust gas are formed, wherein the free piston apparatus comprises an inflow device for fresh gas, which has the at least one inlet opening and is configured in such a way that fresh gas flowing into the combustion chamber is directed to an incident flow region in the combustion chamber arranged offset axially to the at least one inlet opening in the direction of the at least one outlet opening, which incident flow region is arranged off-center relative to the axis.

2. The free piston apparatus according to claim 1, wherein the inflow device is configured such that a tumble-shaped movement of the inflowing fresh gas in the combustion chamber is achievable, wherein inflowing fresh gas rolls about a tumble axis which is aligned transverse to the axis.

3. The free piston apparatus according to claim 2, wherein the tumble axis is arranged centrally or substantially centrally between the at least one inlet opening and the at least one outlet opening.

4. The free piston apparatus according to claim 1, wherein the incident flow region is arranged in axial direction approximately centrally between the at least one inlet opening and the at least one outlet opening, or wherein the incident flow region is arranged upstream of a center between the at least one inlet opening and the at least one outlet opening in the direction of the at least one inlet opening.

5. The free piston apparatus according to claim 1, wherein the at least one inlet opening is configured tilted relative to the axis for achieving an axial movement component of inflowing fresh gas.

6. The free piston apparatus according to claim 5, wherein a plurality of inlet openings is provided, which are configured tilted relative to the axis.

7. The free piston apparatus according to claim 1, wherein a plurality of inlet openings spaced apart from each other in circumferential direction of the axis is provided.

8. The free piston apparatus according to claim 7, wherein the plurality of inlet openings are formed at the same position on the wall arrangement in axial direction.

9. The free piston apparatus according to claim 8, wherein the inlet openings are arranged and configured on the wall arrangement so as to be mirror-symmetrical to each other with respect to a central longitudinal plane of the piston receptacle containing the axis.

10. The free piston apparatus according to claim 1, wherein an inlet opening is provided which is directed radial to the axis and towards a side of the wall arrangement opposite the inlet opening, with respect to a section plane transverse to the axis, wherein the incident flow region is arranged on the side of the combustion chamber opposite the inlet opening.

11. The free piston apparatus according to claim 10, wherein no inlet opening is formed on the wall arrangement on a side opposite said inlet opening, with respect to the axis.

12. The free piston apparatus according to claim 1, wherein an inlet opening is provided which, with respect to a section plane transverse to the axis, is not directed radial to the axis, but rather to a region of the combustion chamber which has an angular distance to the inlet opening of less than 180° in circumferential direction of the axis.

13. The free piston apparatus according to claim 12, wherein associated with the inlet opening is a corresponding inlet opening aligned as a mirror image thereto with respect to a central longitudinal plane of the piston receptacle.

14. The free piston apparatus according to claim 12, wherein at least one further inlet opening is provided which is directed to the same region of the combustion chamber which has a smaller angular distance to the further inlet opening in circumferential direction of the axis than the first mentioned inlet opening.

15. The free piston apparatus according to claim 14, wherein the greater the angular distance between the inlet opening and the region of the combustion chamber is, the greater a volumetric flow of inflowing fresh gas is.

16. The free piston apparatus according to claim 1, wherein the inflow device comprises or forms an inflow chamber which surrounds the wall arrangement and which is able to be acted upon with fresh gas by way of a supply conduit and which opens into the combustion chamber via the at least one inlet opening.

17. The free piston apparatus according to claim 1, wherein the free piston apparatus has an actuator at at least one inlet opening, by way of which the inflow direction for fresh gas into the combustion chamber is adjustable.

18. The free piston apparatus according to claim 1, wherein the piston receptacle comprises a housing and a piston bushing which is inserted into the housing and comprises or forms the wall arrangement, wherein the piston is reciprocable in the piston bushing and at least the at least one inlet opening is formed in the piston bushing.

19. The free piston apparatus according to claim 1, wherein the piston is movable at least partially over the at least one inlet opening and wherein the latter is at least partially unblockable upon the piston adopting the bottom dead center.

20. The free piston apparatus according to claim 1, wherein the free piston apparatus comprises a further piston device having a piston, wherein the pistons of both piston devices are positioned in opposed piston arrangement, wherein the combustion chamber is formed between the pistons.

21. The free piston apparatus according to claim 20, wherein the piston of the further piston device is movable at least partially over the at least one outlet opening and wherein the latter is at least partially unblockable upon the piston adopting the bottom dead center.

22. The free piston apparatus according to claim 1, wherein the free piston apparatus comprises an energy coupling device which is coupled to the piston device and by way of which energy is able to be decoupled from the piston device or by way of which energy is able to be coupled into the piston device.

23. The free piston apparatus according to claim 22, wherein the energy coupling device comprises at least one linear generator.

24. A method for operating a free piston apparatus that comprises a piston receptacle in which at least one piston device having a piston is arranged so as to be reciprocable along an axis, wherein the piston receptacle comprises or forms a combustion chamber delimited by a wall arrangement in which at least one inlet opening for the supply of fresh gas and, spaced apart therefrom in axial direction, at least one outlet opening for the removal of exhaust gas are formed, wherein an inflow device for fresh gas is provided, which has the at least one inlet opening and is configured in such a way that fresh gas flowing into the combustion chamber is directed to an incident flow region in the combustion chamber arranged offset axially to the at least one inlet opening in the direction of the at least one outlet opening, which incident flow region is arranged off-center relative to the axis.

* * * * *